United States Patent [19]

Frost

[11] 4,295,383
[45] Oct. 20, 1981

[54] VARIABLE SPEED DRIVE

[75] Inventor: John W. Frost, De Pere, Wis.

[73] Assignee: W. R. Grace & Co., New York, N.Y.

[21] Appl. No.: 850,607

[22] Filed: Nov. 11, 1977

[51] Int. Cl.³ .......................... F16H 7/08; F16G 5/16
[52] U.S. Cl. ...................................... 474/83; 474/146; 474/237; 474/272
[58] Field of Search ....................... 74/242.3, 192, 606, 74/233, 234; 428/473, 474; 474/237, 269, 272, 83

[56] References Cited

U.S. PATENT DOCUMENTS

| 1,000,633 | 8/1911 | Stauffer | 74/242.3 |
| 1,098,983 | 6/1914 | Severy et al. | 74/242.3 |
| 1,256,418 | 2/1918 | Yocum | 74/242.3 |
| 1,874,905 | 8/1932 | Coffey | 74/606 |
| 2,957,783 | 10/1960 | Dach et al. | 428/474 |
| 3,394,602 | 7/1968 | Coghill | 74/192 |
| 3,906,809 | 9/1975 | Erickson | 74/192 |
| 4,027,545 | 6/1977 | White, Jr. | 74/233 |

FOREIGN PATENT DOCUMENTS 399180  6/1909  France ............................... 74/242.3

Primary Examiner—Samuel Scott
Assistant Examiner—Wesley S. Ratliff, Jr.
Attorney, Agent, or Firm—James E. Nilles

[57] ABSTRACT

A variable speed drive of the type having opposed, and parallel-arranged, frusto-conical shaped rollers over which a flat endless belt is trained. The belt is shiftable axially along the length of the rollers to produce an infinitely variable drive between the input and output shafts. The drive mechanism is enclosed in a case and the drive is adjusted from the outside of the case. The belt is properly assembled during assembly by utilizing a belt of known size and arranging for the location of the tapered roller shafts in the case in the precise manner so that the belt is brought to its final proper tension when the second roller is assembled in its preselected openings in the case.

5 Claims, 6 Drawing Figures

VARIABLE SPEED DRIVE

BACKGROUND OF THE INVENTION

Various types of variable speed transmission and drive mechanisms have been proposed where a pair of cone-shaped pulleys or rollers are mounted on parallel axes, with the apex of the cones or frusto-conical shaped rollers being oppositely directed. A belt is entrained about each cone or roller and may be positioned laterally in order to achieve varying drive ratios. These prior art devices have usually been difficult to assemble and adjust and numerous operations and parts were required to assemble and operate the drive unit, in order to provide the proper tension for the endless belt entrained over the rollers. Furthermore, the prior art devices were expensive to fabricate, particularly the cones or the tapered rollers and were not sufficiently simple in construction and compact in size so as to enable their use in restricted areas.

Assemblies of such prior art devices are shown in the United States Pat. No. 2,638,008 issued May 12, 1953 which has shifter wheels that force the belt onto the cones for good contact; and U.S. Pat. No. 2,734,391 which issued Feb. 14, 1956 and which employs an electromagnetic shifter for shifting the endless belt along the length of tapered rollers.

SUMMARY OF THE PRESENT INVENTION

The present invention provides a compact and simple variable speed transmission which is fully enclosed in a case and which transmission includes a pair of parallel, tapered rollers having their smaller ends oppositely disposed and including an endless flat belt entrained over the rollers. Anti-friction bearing assemblies are used and are located on the shafts of each roller and are fastened in accurately located openings in the case by means of snap rings on the outer race of the bearing assemblies and which snap rings are located on the inside of the enclosing case. The invention contemplates the use of an endless belt of predetermined size and the proper tension of which can be achieved during the assembly process, more specifically, final tension is imparted to the belt when the second roller axis is urged into its proper opening in the lower half of the enclosing case. Another aspect of the invention relates to the particularly compact width of the case by means of diposing the antifriction bearing assemblies in the case walls and securing them in position with snap rings located on the inside of the case and engaging the outer race of the bearings. Still another aspect of the invention relates to the economical and simple fabrication of the tapered rollers from standard weight pipe. The belt utilized with the present invention is of high tensile strength, has high tension retaining elasticity and is stretchless. The belt is made of a combination of chrome leather on the driving face which provides a good coefficient of friction, even when oil is present and is extremely resistent to abrasion. The leather is laminated or bonded to a nylon and polyester plastic which provides high tension strength and tension retaining elasticity.

The shifting arrangement for the belt is simple and shifting is accomplished from the outside of the fully enclosed drive mechanism.

These and other objects and advantages of the present invention will appear hereinafter as the disclosure progresses.

DESCRIPTION OF A PREFERRED EMBODIMENT

Figure 1:
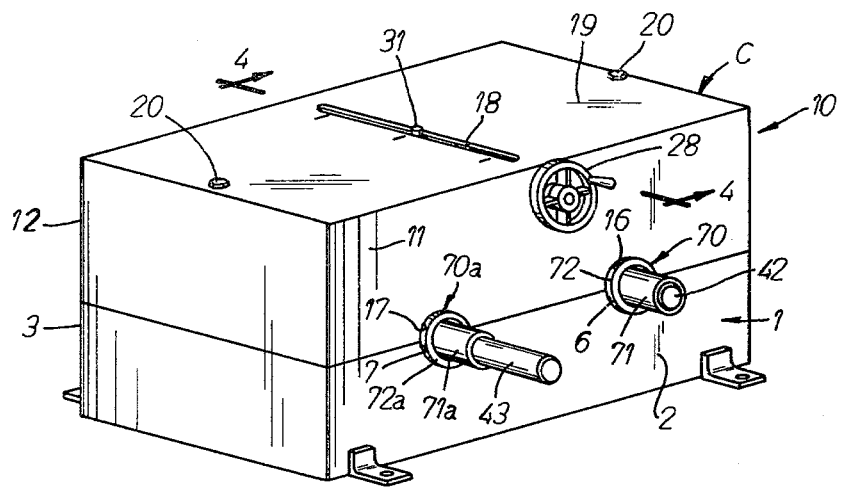
FIG. 1 is a perspective view of the enclosed variable speed transmission made in accordance with the present invention.

The casing C which fully encloses the variable speed drive is generally rectangular in shape and includes a lower half 1 having side walls 2 and 3 and in each of which are formed a pair of semi-circular, upwardly facing openings 6 and 7. The casing also includes an upper half 10 also having side walls 11 and 12 in which are formed downwardly facing, semi-circular-shaped openings 16 and 17 which when in the assembled position, are opposed to openings 6 and 7 so as to form a circular opening therewith. The upper half also has a transverse slot 18 extending through its top side 19. Bolt means 20 extend through the top section and are threadably engaged in threaded blocks 22 welded to the inside of the lower half. Thus, to dissassemble the casing, it is only necessary to remove the bolt means 20.

A belt adjusting means 24 is mounted in the upper half and includes a transversely arranged threaded rod 26 rotatably mounted in the side walls 11 and 12 and to the end of which is fixed the hand wheel 28. A U-shaped adjusting bracket 30 is threadably engaged on the rod and has an upwardly extending indicator 31 that extends through the slot 18 of the upper casing so as to be visible from the outside thereof.

Figure 5:
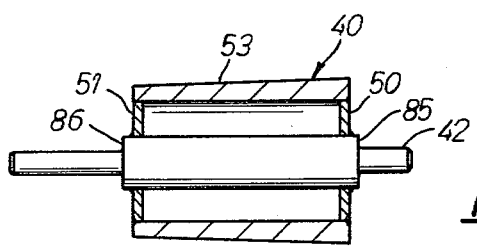
FIG. 5 is a cross-sectional view on a reduced scale through one of the tapered rollers and showing the method of fabrication thereof.
Figure 4:
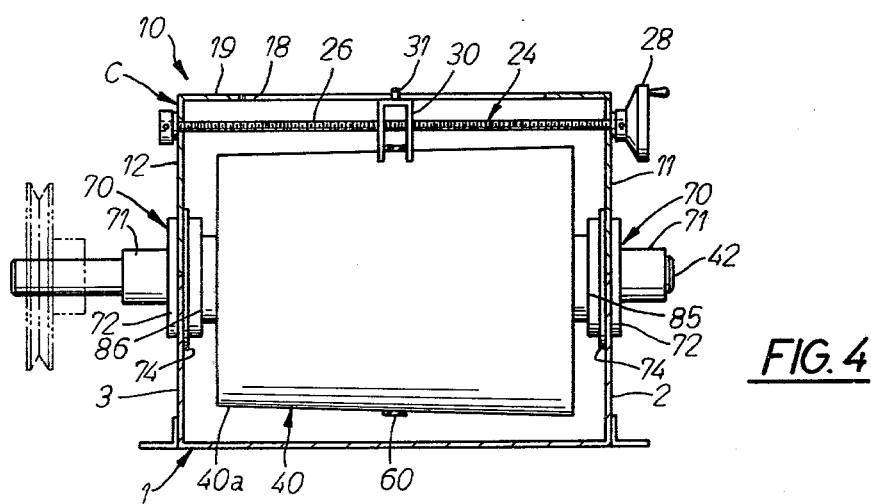
FIG. 4 is a transverse sectional view through the transmission assembly shown in FIG. 1, the view being taken generally along the line 4—4 in FIG. 1.
Figure 6:
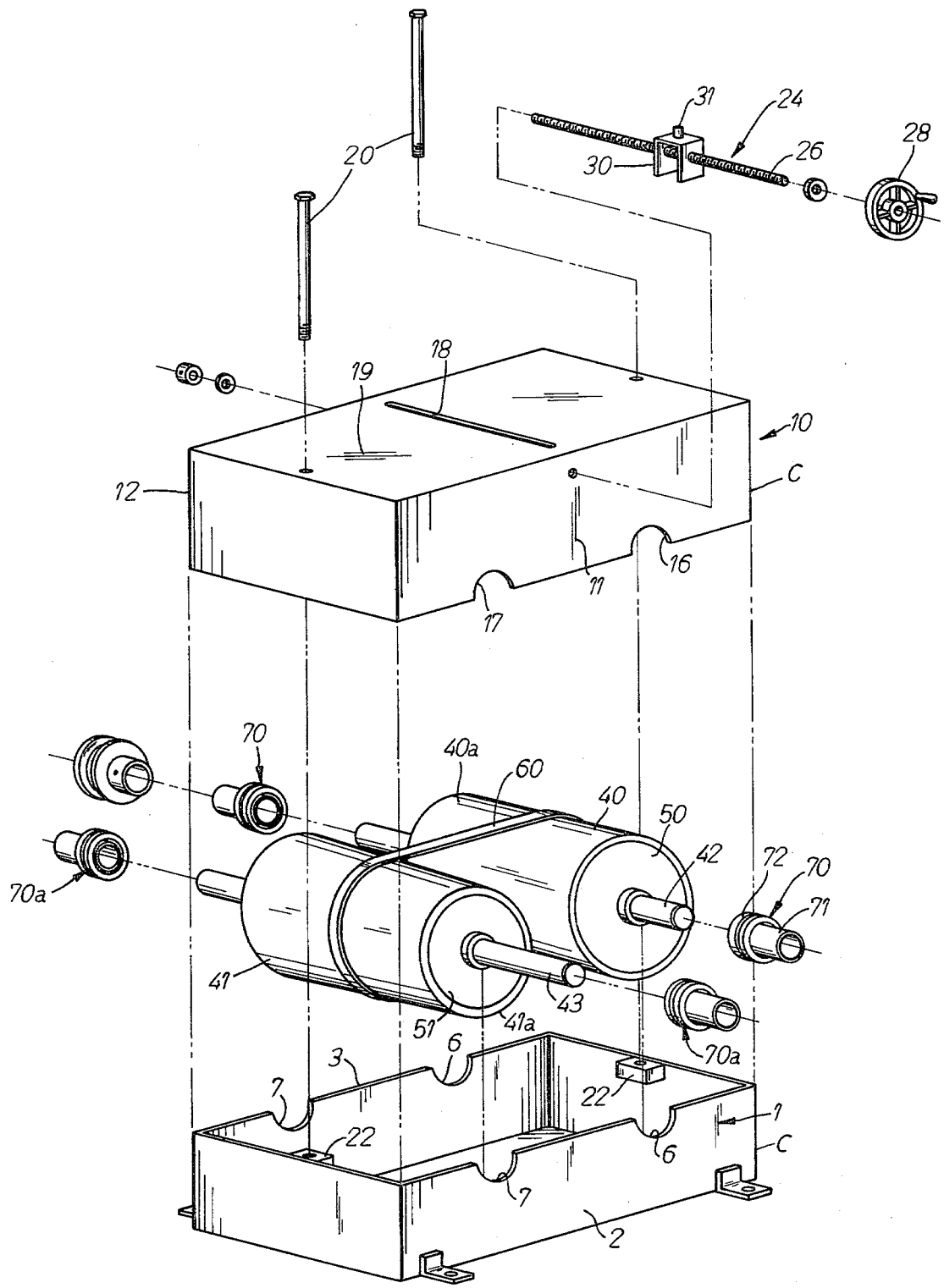
FIG. 6 is a perspective exploded view of the variable speed drive.

The variable speed transmission includes a pair of frusto-conical rollers 40, 41 which have their respective shafts 42 and 43 arranged in parallelism and spaced apart from one another with the smaller diameter ends 40a and 41a of rollers 40 and 41, respectively, oppositely disposed from one another. The rollers are constructed similarly and by referring to FIG. 5 wherein reference is made to roller 40, it will be noted that the shaft 42 has a pair of end spiders 50, 51 welded thereto and these circular spiders in turn are welded within a piece of standard pipe 53. The pipe 53 is then turned on a lathe so as to provide a tapered surface to the exterior of the roller 40 as shown. Thus, the rollers are simply and economically produced.

A flat flexible and endless belt 60 is entrained over the rollers and is engaged by the shifter 30 so as to be laterally disposed along the length of the rollers to vary the drive ratio between the shafts in a known manner. This belt is made of a combination of chrome leather on the inner driving face which is laminated to a plastic material of nylon and polyester. This combination provides high tensile strength and tension retaining elasticity. The chrome leather provides excellent coefficient of friction, even in the presence of oil and is also extremely resistent to abrasion.

A pair of anti-friction bearing assemblies 70 are secured to shaft 42 and it will be noted that the inner race 71 thereof extends outwardly past the outer race 72 of the bearing assemblies. It should also be noted that when in the assembled position shown in FIG. 2, a snap ring 74 is located on the inside of the walls 2 and 3 of the lower case and abut thereagainst. These snap rings are engaged in complementary grooves in the outer race of the bearing assemblies.

Figure 3:
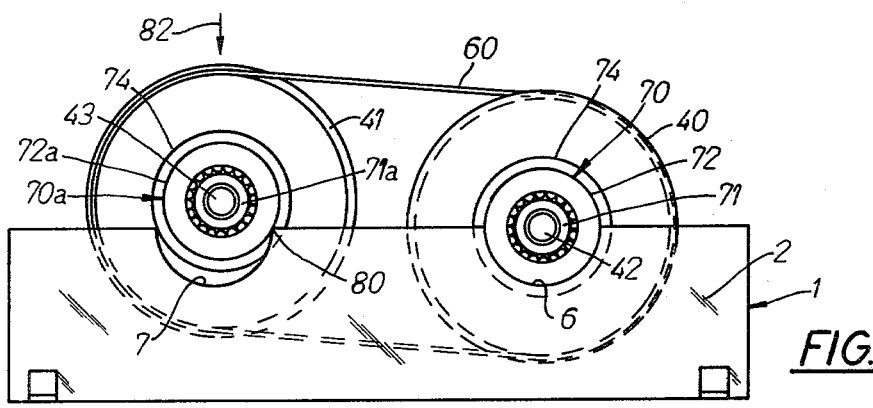
FIG. 3 is a side elevational view of the transmission, but with the upper half of the case removed and furthermore, showing the second shaft as it is being forced into the recesses in the side wall in the casing and which properly tensions the endless belt.

The bearing assemblies for shaft 43 are similar to those of shaft 42 and have been correspondingly numbered with the addition of a suffix "a". The outer race of the bearing assemblies are adapted to fit snugly into the openings 6, 7, 16 and 17 of the side walls of the casing so as to be firmly seated therein without any further adjustment. To assemble the unit, the roller 40 and its bearings are first located in their respective semicircular openings 6 of the lower casing, as shown in FIG. 3. The belt 60 has been assembled over the rollers and the second roller 43 is then positioned over the semi-circular opening 7 in the lower case. As shown in FIG. 3, the size of the belt 60 is such that the outer race 72a of shaft 43 rests on the corner 80 between the upper edge of the lower casing walls and the semi-circular openings 7 thereof. In other words, the tension of the belt is such at this stage that the bearings 72a do not drop in their respective semi-circular opening 7. Instead, it is necessary at this stage of the assembly to press downwardly on the roller 41 as indicated by the arrow 82 in FIG. 3. This pressure will force the bearings into their opening 7 and against the tension in the belt 60, thereby increasing the distance between the shafts and placing the belt 60 under additional stretching action and tension. By predetermining the space between the openings 6 and 7 and the tension of the belt when in the assembled position, the final assembly results in proper tension of the belt 60 without further adjustment.

Figure 2:
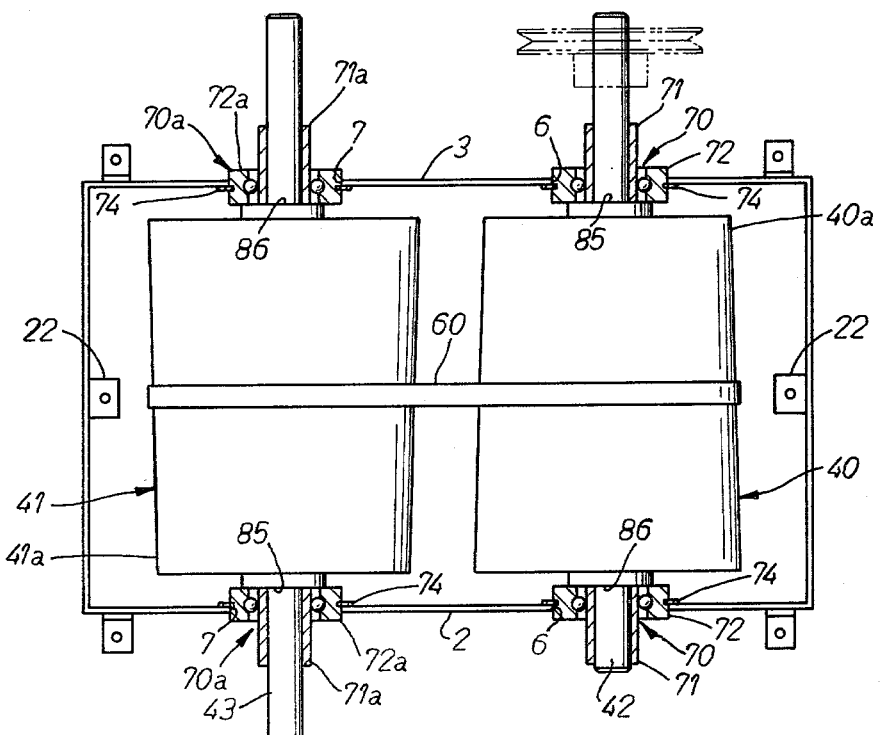
FIG. 2 is a plan view of the transmission with the top half of the case removed and with certain parts being shown in cross section.

By viewing FIG. 2, it can be seen that the transverse width of the casing is relatively narrow by virtue of the fact that the inner race 71 extends outwardly of the casing wall.

By referring again to FIG. 5, it will be noted that the intermediate portion of the shaft have a diametrically enlarged central portion which defines shoulders 85, 86 at either end thereof. FIG. 2 shows how the rollers are held axially in place because the shoulders 85 and 86 bear respectively against the inner races 71 of the bearing assemblies.

The belt can be easily adjusted by turning the hand wheel 28 thereby rotating the threaded shaft 26 and causing the shifter 30 to move transversely, carrying with it the belt 60 to any infinitely variable position along the length of the rollers.

By means of the present invention, a particularly compact and simple, and fully enclosed transmission is provided. Proper belt tension is obtained by forcing the shaft bearings into the semi-circular openings on the side walls in the casing and considerable leverage can be placed on the belt during final assembly of the second shaft into the casing.

I claim:

1. A variable speed transmission having a pair of tapered rollers arranged in parallelism and each having a smaller end, the smaller end of said roller as being oppositely disposed from one another, said rollers having a central shaft extending from either end thereof, anti-friction bearing assemblies mounted on each of said shafts and adjacent the rollers thereon, a casing for enclosing said rollers and including a lower half having a pair of generally vertical side walls, one on either end of said rollers, said side walls having semi-circular openings therein for the reception of the said bearing assemblies mounted on said shaft, an endless belt trained around said rollers for providing driving connection therebetween, the spacing of the semi-circular openings in each side wall being such that when the bearing assemblies are mounted in said openings, said belt is tensioned to a predetermined magnitude, said belt including a chrome leather driving face which is bonded to a combination nylon and polyester plastic.

2. A variable speed transmission having a pair of tapered rollers arranged in parallelism and each having a smaller end, the smaller end of said roller as being oppositely disposed from one another, said rollers having a central shaft extending from either end thereof, anti-friction bearing assemblies mounted on each of said shafts and adjacent the rollers thereon, a casing for enclosing said rollers and including a lower half having a pair of generally vertical side walls, one on either end of said rollers, said side walls having semi-circular openings therein for the reception of the said bearing assemblies mounted on said shaft, an endless belt trained around said rollers for providing driving connection therebetween, means on said casing and engaging said belt for laterally shifting said belt along the length of said tapered rollers, the spacing of the semi-circular openings in each side wall being such that when the bearing assemblies are mounted in said openings, said belt is tensioned to a predetermined magnitude, said belt including a chrome leather driving face which is bonded to a combination nylon and polyester plastic.

3. A variable speed transmission having a pair of tapered rollers arranged in parallelism and each having a smaller end, the smaller end of said roller as being oppositely disposed from one another, said rollers having a central shaft extending from either end thereof, anti-friction bearing assemblies mounted on each of said shafts and adjacent the rollers thereon, a pair of end spiders spaced apart from one another and secured to each of said shafts, and a generally cylindrical steel member welded to and around said spiders and extending therebetween, said member being formed with an exterior surface that tapers along its length to form a frusto-conical shape a casing for enclosing said rollers and including a lower half having a pair of generally vertical side walls, one on either end of said rollers, said side walls having semi-circular openings therein for the reception of the said bearing assemblies mounted on said shaft, an endless belt trained around said rollers for providing driving connection therebetween, the spacing of the semi-circular openings in each side wall being such that when the bearing assemblies are mounted in said openings, said belt is tensioned to a predetermined magnitude.

4. A variable speed transmission having a pair of tapered rollers arranged in parallelism and each having a smaller end, the smaller end of said rollers being oppositely disposed from one another, said rollers having a central shaft extending from either end thereof, anti-friction bearing assemblies mounted on each of said shafts and adjacent the rollers thereon, a casing for enclosing said rollers and including a lower half having a pair of generally vertical side walls, one on either end of said rollers, said side walls having semi-circular openings therein for the reception of the said bearing assemblies mounted on said shaft, said bearing assemblies including outer races, snap rings fixed to said outer races and located on inner sides of said side walls of said lower casing and abutting thereagainst; said shafts having diametrically enlarged central portions which define a shoulder at either end, said shoulders abutting against their respective bearing assemblies located in said side walls; said rollers each including a pair of end spiders spaced apart from one another and secured to each of said shafts and a generally cylindrical steel member welded to and around said spiders and extending therebetween, said members being formed with an exterior surface that tapers along its length to form a frusto-conical shape; an endless belt of predetermined length trained around said rollers for providing driving connection therebetween, the spacing of the centerpoints of the semi-circular openings in each side wall being proportioned relative to the diameter of said rollers so that when the bearing assemblies are mounted in said openings, said belt is tensioned to a predetermined magnitude.

5. A variable speed transmission having a pair of tapered rollers arranged in parallelism and each having a smaller end, the smaller end of said rollers being oppositely disposed from one another, said rollers having a central shaft extending from either end thereof, anti-friction bearing assemblies mounted on each of said shafts and adjacent the rollers thereon, a casing for enclosing said rollers and including a lower half having a pair of generally vertical side walls, one on either end of said rollers, said side walls having semi-circular openings therein for the reception of the said bearing assemblies mounted on said shaft, an endless belt of predetermined length trained around said rollers for providing driving connection therebetween, the spacing of the centerpoints of the semi-circular openings in each side wall being proportioned relative to said predetermined length of said belt and relative to the diameter of said rollers so that when the bearing assemblies are mounted in said openings, said belt is tensioned to a predetermined magnitude, means on said casing and engaging said belt for laterally shifting said belt along the length of said tapered rollers, said belt including a chrome leather driving face which is bonded to a combination nylon and polyester plastic, said rollers each including a pair of end spiders spaced apart from one another and secured to said shaft and a generally cylindrical steel member welded to and around said spiders and extending therebetween, said member being formed with an exterior surface that tapers along its length to form a frusto-conical shape.

* * * * *